March 13, 1951  W. E. DUERINGER  2,544,919
PRINTING TOTALIZER FOR STYLUS RECORDING METERS
Filed April 10, 1947  2 Sheets-Sheet 1

*INVENTOR.*
WALTER E. DUERINGER
BY
*ATTORNEY*

March 13, 1951  W. E. DUERINGER  2,544,919
PRINTING TOTALIZER FOR STYLUS RECORDING METERS
Filed April 10, 1947  2 Sheets-Sheet 2

*INVENTOR.*
WALTER E. DUERINGER
BY
Raymond W. Jenkins
*ATTORNEY*

Patented Mar. 13, 1951

2,544,919

UNITED STATES PATENT OFFICE 2,544,919

PRINTING TOTALIZER FOR STYLUS RECORDING METERS

Walter E. Dueringer, Shaker Heights, Ohio, assignor to Bailey Meter Company, a corporation of Delaware Application April 10, 1947, Serial No. 740,648

11 Claims. (Cl. 346—35)

This invention relates to devices which are adapted to provide from time to time a graphic indication of the totals of a variable measured by a meter. It relates more particularly to counting mechanisms which are arranged to print upon the chart of a recording meter, the total measured by such meter.

A meter for measuring a variable usually provides either an indication or a record of the instantaneous values of the variable. In the measurement of certain variables, such as the flow of fluid, it is sometimes desirable that there be provided at predetermined times, a record of the total volume of fluid measured. In a patent to Gorrie 1,892,183, issued December 27, 1932, there is shown a mechanism which gives a continuous indication of the total quantity of fluid passing a given point after a predetermined time. It is possible, of course, to note from such mechanism the total flow during any period of time. It is not always convenient, however, to note such reading, and it is desirable that some mechanism be provided for recording automatically the total flow during predetermined intervals of time.

An object of my invention is to provide an improved mechanism for recording at the ends of predetermined time intervals the totals of values measured by a meter. Another object is to provide a mechanism including a counter which totalizes the instantaneous values of a variable and is adapted to be actuated for printing upon a chart the total of the values. Yet another object is to provide an improved printing counter mechanism which may be operated at will or automatically at the ends of predetermined time intervals. Other objects will appear in the course of the following description.

There are shown in the accompanying drawings several forms which my invention may assume in practice. In these drawings.

Figure 1:
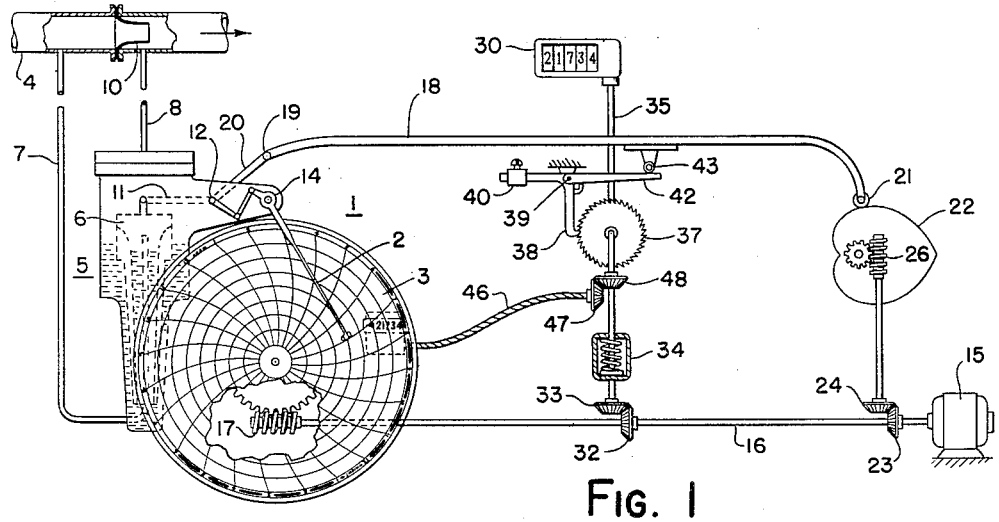
Fig. 1 is a diagrammatic representation of my invention with a meter for measuring the rate of fluid flow.
Figure 5:
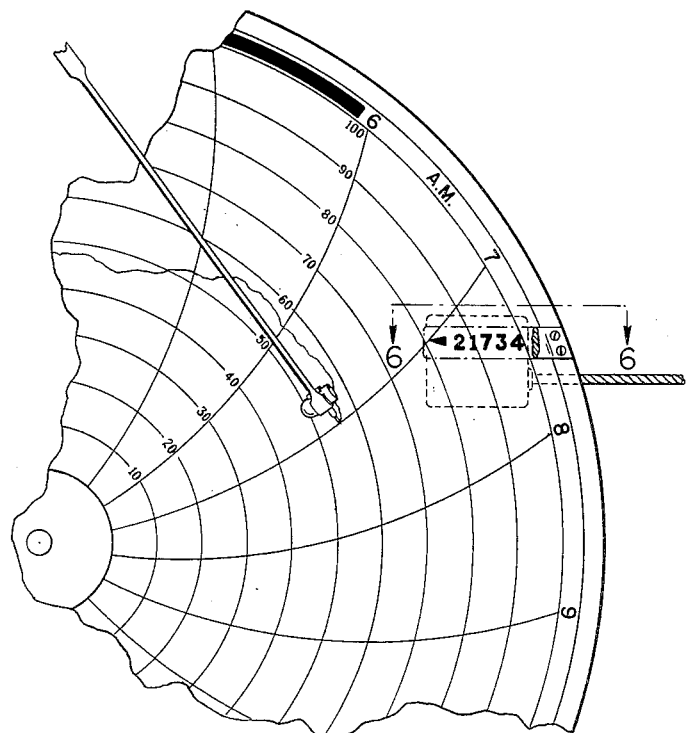
Fig. 5 is an enlarged fragmentary view of the meter chart, and shows the relationship of the records of instantaneous and total values.

Referring to the drawings, and particularly to Fig. 1, it will be noted that there is shown a meter 1 having a pen arm 2 for recording upon a chart 3 the rate of fluid flow in a conduit 4. A device 5 includes a liquid sealed bell 6 which is subjected on opposite surfaces through conduits 7 and 8 to pressures at opposite sides of a flow nozzle 10 in the conduit 4. The bell is so shaped that its position is varied in direct proportion to the rate of fluid flow, and a lever 11 pivotally supported at 12 is connected to the bell 6 and to the pen arm for swinging the latter about a pivot point 14. A motor 15 operates through a shaft 16 and worm gearing 17 to rotate the chart so that the pen arm records thereon, as shown in Fig. 5, the instantaneous rates of fluid flow. The device 5 forms the subject matter of the patent to Ledoux 1,064,748, granted June 17, 1913, and reference may be had thereto for a more detailed description.

In order to obtain a reading of the total fluid flow during any interval of time, there is provided an integrating mechanism which includes a member 18 pivotally connected at one end 19 to an arm 20 of the lever 11, and the member carries at its other end a roller 21 which bears upon a cam 22 driven at a constant speed by the motor 15 through bevel gears 23, 24, and worm gearing 26. The cam is so shaped as to reciprocate the roller-carrying end of the member 18 at a uniform speed between predetermined limits.

A register 30 providing a continuous indication of the total flow of fluid in conduit 4 is driven from the shaft 16 through bevel gears 32, 33, a friction device 34, and a shaft 35. The friction device is arranged to slip so that the gear 33 may continue to rotate while the shaft 35 is locked against rotation. In order that the shaft 35 may be locked against rotation, a toothed wheel 37 is fixed to the shaft and is adapted to be engaged by a pawl 38 which is pivotally supported at 39. A counterweight 40 is carried by a projecting arm of the pawl for holding the latter normally in engagement with the toothed wheel. An arm 42 is fixed to the pawl 38 and is adapted to be engaged by a roller 43 carried by the member 18 for moving the pawl out of engagement with the wheel during intervals of time varying with the rate of fluid flow in conduit 4.

If there is no fluid flowing in conduit 4, the pivot point 19 is held high enough so that the right-hand end of the member 18 is never lowered to a point where the roller 43 acts on the arm 42 to move the pawl out of engagement with the wheel 37. The shaft 35 is held locked during this time and prevents any change in the reading of the register 30. A flow of fluid causes the pivot point 19 to be lowered, and this results in an engagement of the roller 43 with the arm 42 to move the pawl out of engagement with the wheel 37 during a portion of each revolution of the cam 22. The lowering of the pivot point varies directly with the increase in the rate of fluid flow, and the periods during which the wheel 37 is released vary directly with the lowering of the pivot point. When the wheel is released, the motor 15 drives the register 30 at a constant rate to increase its reading. Since the register is driven during periods which vary directly with the rate of flow, it will be seen that the reading of the register will indicate the total flow through the conduit 4. The integrating mechanism described is disclosed in the patent to Gorrie 1,892,183, granted December 27, 1932, and further description of the same herein is considered unnecessary.

Figure 6:
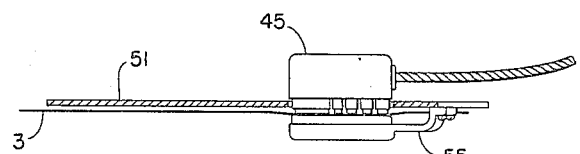
Fig. 6 is a view taken substantially on the plane of the line 6—6 of Fig. 5.

In order that a record may be obtained of the total flow, I have provided a printing counter 45 connected through a flexible drive connection 46 and bevel gears 47, 48 to the shaft 35. The counter is pivotally supported, as by bosses 50, at the rear side of the backing plate 51 for the chart 3, and formed in the backing plate is an opening 52 through which counter wheels bearing numerals may be moved to engage the rear side of the chart 3 and press the latter into engagement with a marking device 54, such as an ink pad or carbon paper. As shown in Fig. 6, a bracket 55 is attached to the forward face of the backing plate at the outer edge of the chart 3 and supports the device 54 in front of the chart over the opening 52. It will be seen that a pressing of the chart against the ink pad or carbon paper by the counter wheels results in a printing of the numerals on the face of a chart. In order to indicate on the chart the time at which the printing of the total took place, an arrow may be printed, as shown in Figs. 1 and 5, to designate the radial line coming under the marking pen when the total was recorded.

Figure 2:
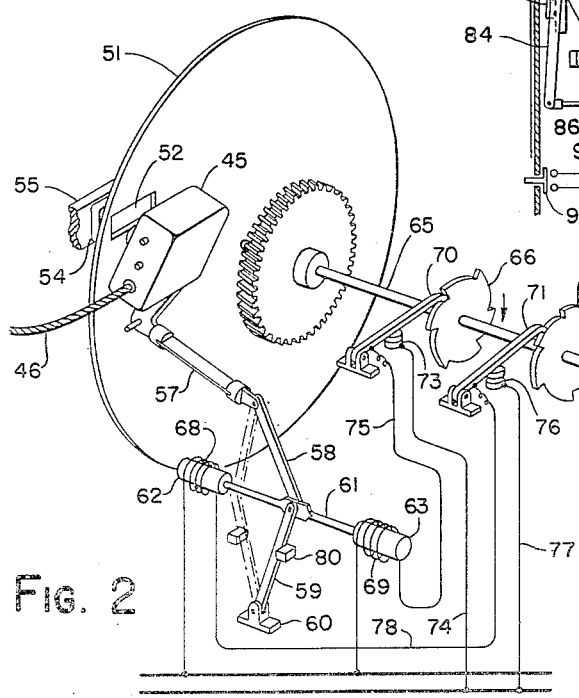
Fig. 2 is an enlarged perspective view of the printing counter of Fig. 1, and a preferred form of actuating mechanism for such counter.

In each form of my invention I have shown means operating automatically at the ends of predetermined time intervals for moving the counter 45 from a non-printing to a printing position. In Fig. 2, the counter is shown connected through a flexible arm 57 to one end of a link 58. Another link 59 is pivotally connected at one end to a stationary support 60, and the other ends of the links 58, 59 are pivotally connected to an elongated member 61 carrying solenoid plungers 62, 63 at its opposite ends. The links 58, 59 are so formed that a movement of the member 61 from one of its limiting positions to another results in a movement of the counter from the position shown to its printing position and back again. Connected to a shaft 65 driven by the chart rotating means are cams 66 and 67, for controlling circuits including windings 68 and 69 for the solenoid plungers. The cams are provided with tooth like portions upon which contact arms 70 and 71 are adapted to ride. When the arm 70 drops from the top of one tooth portion to the base of the next portion, it engages a contact 73 and completes a circuit from one side of a power line through a conductor 74, the contact arm 70, a conductor 75 and the solenoid winding 63 to the other side of the power line. A dropping of the contact arm 71 from the top of one tooth portion to the base of the next portion causes it to engage a contact 76 and complete a circuit from one side of the power line through a conductor 77, the contact arm 71, a conductor 78 and the solenoid winding 62 to the other side of the power line. The cams 66, 67 are so arranged on the shaft that one of the contact arms is riding on a tooth portion at a point where it is held out of engagement with its contact when the other contact arm is dropping from the top of a tooth portion to engage its contact and energize the solenoid winding in the circuit to which it is connected. Each cam is shown provided with six uniformly shaped toothed portions so that there is provided during a complete rotation of the chart, twelve printing operations of the counter 45 at regular intervals. It will be understood, of course, that the number of tooth portions may be different from that shown and may be non-uniform in shape.

As the cams move into the positions shown, the contact arm 70 engages its contact and completes a circuit through the winding 69 for moving the counter 45 to its printing position and back again. The winding continues to be energized until the contact arm is moved out of engagement with its contact by the rotation of the cam in the direction of the arrow. The energized winding tends to center the plunger within it and thereby prevent excessive traveling of the plunger in either direction. To prevent movement of the parts out of their operative positions when the circuits are deenergized, abutment means 80 may be provided for limiting the movement of the links in opposite directions. When the cam 67 rotates far enough so that the contact arm 71 drops from the tooth portion it is shown riding, the winding 68 is energized to move the links 58, 59 into the positions shown in dotted lines. Such movement effects another printing operation of the counter, and, by reason of the flexible arm 57, the operating force applied to the counter may be limited to prevent breakage of parts while pressing the chart against the device 54.

Figures 3, 4:
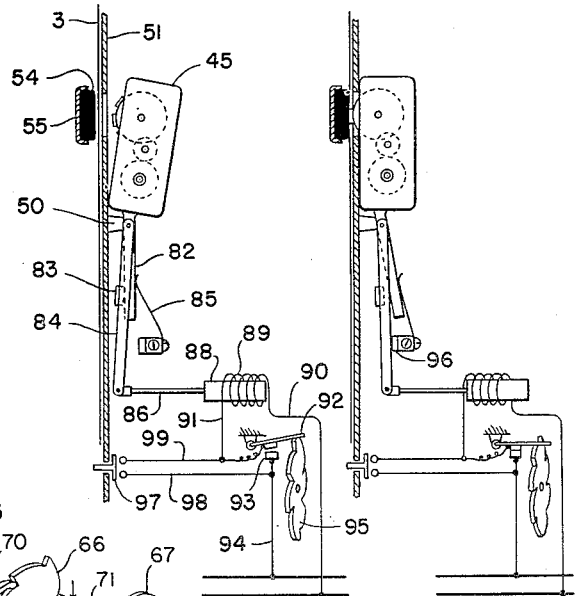
Fig. 3 is a side elevational view of the printing counter with another form of actuating mechanism.
Fig. 4 is a view similar to Fig. 3, but showing the counter in a different position.

Figs. 3 and 4 show another form of actuating means for the counter 45. In this case the counter is provided with an arm 82 extending below the supporting boss 50 and engageable with an abutment portion 83 on a lever 84 which is also pivotally supported by the boss. A spring 85 urges the arm 82 toward the abutment portion 83 and tends to hold the parts in the positions shown in Fig. 3. A member 86 is connected at one of its ends to the lower end of the lever 84, and carries a solenoid plunger 88 at its other end. A solenoid winding 89 is connected by a conductor 90 to one side of a power line, and is connected by a conductor 91, a contact arm 92, a contact 93, and a conductor 94 to the other side of the power line. A cam 95, similar to the cams 66, 67 of Fig. 2 and adapted to be rotated with the chart 3 in a similar manner, controls the positioning of the contact arm 92 relative to the contact 93.

When the contact arm 92 engages the contact 93, the circuit including the solenoid winding is completed and the plunger 88 is actuated to move the lever 84 into engagement with a stationary abutment 96, as shown in Fig. 4. The counter is swung with the lever 84 by reason of the engagement between the arm 82 and the abutment portion 83. When the lever 84 engages the abutment 96, the counter continues to swing against the action of spring 85 due to its inertia and acts against the chart to press it into engagement with the ink pad 54. As soon as the printing action is completed, the spring 85 moves the counter away from the chart until the arm 82 engages the abutment 83. When the solenoid winding is deenergized by a movement of the contact arm away from the contact 93, the spring 85 moves the counter and the lever 84 to the positions of Fig. 3. In order that the counter may be actuated at will, a manually operable switch 97 is provided for completing a circuit through conductors 98, 99 by-passing the contact arm 92 and contact 93.

Figure 7:
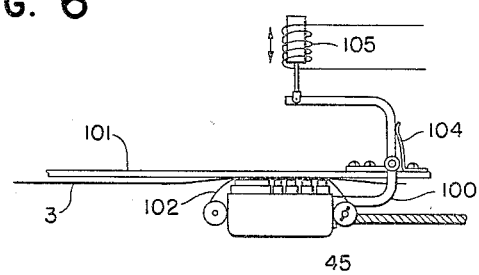
Fig. 7 is a view similar to that of Fig. 6 but showing a counter arranged and actuated to print directly upon the face of the chart.

Fig. 7 shows the counter 45 supported by a lever 100 at the forward side of the chart 3. The lever is carried by the chart backing plate 101, which is made solid so that the chart may be pressed against it by the counter. An inked ribbon or piece of carbon paper 102 is shown adjustably supported by the counter in a position between the counter wheels and the chart. A spring 104 acts on the lever 100 for holding the counter normally in a position away from the chart. A solenoid 105 is operatively connected to the lever and is adapted when energized to move the counter into its printing position. A circuit similar to those shown in the other forms of my invention may be used for controlling the energizing of the solenoid.

Figure 8:
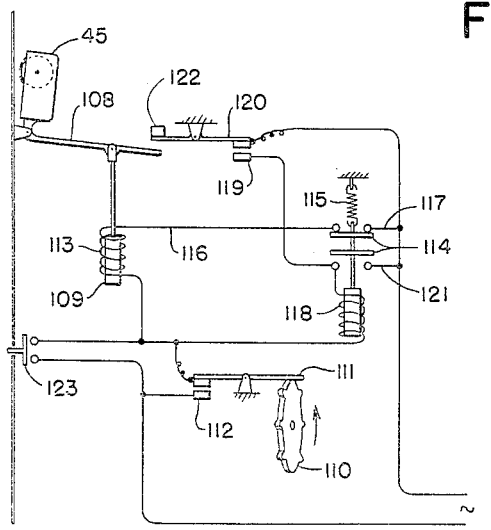
Fig. 8 is a schematic diagram of another control system for the printing counter.

Fig. 8 shows another system whereby the counter may be moved automatically or at will into its printing position. The counter has a projecting arm 108 carrying a solenoid plunger 109, and is normally held away from the chart by the weight of these parts. A cam 110 has projecting portions which engage a switch arm 111 for moving it into engagement with a contact 112 and completing a connection from one side of a power line to one end of a winding 113 for the plunger 109. A double-pole double-throw switch 114 is normally held by a spring 115 in a position to connect the other end of the winding through conductors 116, 117 to the other side of the power line. A solenoid 118 has its plunger fixed to the switch 114 and its winding connected to the switch arm 111 and to a contact 119 which is adapted to be engaged by a switch arm 120 connected to the power line. An energizing of the solenoid 118 results in a movement of the switch 114 to complete a connection from the solenoid winding through a conductor 121 to the power line, and to break the connection between conductors 116, 117. The switch arm 120 is normally held in an open position, as by a weight 122, and is arranged to be moved to its closed position by the arm 108 when the counter swings to its printing position.

When the parts are in the positions shown, a closing of switch arm 111 results in the energizing of solenoid winding 113 through conductor 116, switch 114, and conductor 117. The counter is then moved to its printing position and closes switch arm 120 to complete a circuit through solenoid 118 to the power line. The switch 114 is then actuated by the solenoid to open the circuit through winding 113 and to close another circuit from the solenoid 118 to the power line. As soon as the circuit through the winding 113 is opened, the counter moves away from the chart and permits the switch arm 120 to move out of engagement with the contact 119. The solenoid 118 continues to be energized through the switch 114 and the conductor 121 as long as the switch arm 111 remains closed. An opening of the switch arm 111 causes the solenoid 118 to be deenergized so that the switch 114 moves again to a position connecting the winding 113 to the power line. The circuit including the winding 113 is not completed, however, until the switch arm 111 is closed once more by the cam. A manually operable switch 123 is arranged to complete a circuit by-passing the switch arm 111 and contact 112 so that a printing operation of the counter may be obtained at will.

It will be noted that each form of my invention provides for the movement of the counter away from the chart immediately after its printing operation in order that the printed figures may not be smeared by movement of the chart while it is held by the counter against the ink pad. It is not possible to delay such movement until the circuits are deenergized because a movement of the chart must take place before the cams operate to open the circuits. While the cams are shown driven by the chart rotating means, it will be understood that they may be driven by any other suitable means. It will also be understood that any suitable mechanical actuating means may be provided for the counter, if desired, in place of the cam controlled solenoids.

While there are shown in this application several forms which my invention may assume in practice, it will be understood that it may be modified and embodied in various other forms without departing from the spirit or the scope of the appended claims.

What I claim as new, and desire to secure by Letters Patent of the United States, is:

1. In combination with a meter which records on a driven chart the instantaneous values of a variable and has associated therewith a printing counter driven to totalize the values of the variable, means for pivotally supporting the counter in a position to be moved into a printing relationship with the chart, and means for moving the counter automatically into printing relationship with the chart at the ends of predetermined time intervals, said last mentioned means including a solenoid operatively connected to said counter, a circuit for connecting said solenoid to a source of power, a switch included in said circuit, and cam means actuated by the chart driving means for controlling said switch.

2. In combination with a meter which records on a driven chart the instantaneous values of a variable and has associated therewith backing means for the chart and a printing counter driven to totalize the values of the variable, means for pivotally supporting the counter in a position to be moved so that its printing elements engage the back side of the chart, said pivotal supporting means and said printing counter being disposed wholly at the back side of the backing means, a marking device, means for fixedly supporting the marking device at the face of the chart in front of the counter, said device being adapted to mark upon the face of the chart the setting of the counter when the latter presses the chart against it, and means for moving the counter against the chart automatically at the ends of predetermined time intervals.

3. In combination with a meter having stylus means which records on the face of a driven chart the instantaneous values of a variable and has associated therewith backing means for the chart and a printing counter driven to totalize the values of the variable, means for pivotally supporting the counter wholly on the back side of the backing means and in a position to be moved so that its printing elements engage the back side of the chart, a marking device, means for fixedly supporting the marking device at the face of the chart in front of the counter, said device being adapted to mark upon the face of the chart the setting of the counter when the latter presses the chart against it, a mechanism disposed on the back side of the backing means and connected to said counter for actuating the latter for printing, and means for periodically operating said mechanism.

4. In combination with a meter which records on a driven chart the instantaneous values of a variable and has associated therewith a printing counter driven to totalize the values of the variable, means supporting said counter for movement against the back side of the chart, a marking device, means for supporting the marking device at the face of the chart in front of said counter, said device adapted to mark upon the face of the chart the setting of said counter when the latter presses the chart against it, a solenoid actuated mechanism for moving said counter against said chart, and means including a cam driven with said chart for controlling the energizing of said solenoid.

5. In combination with a meter which records on a driven chart the instantaneous values of a variable and has associated therewith a printing counter driven to totalize the values of the variable, means supporting said counter for movement against the back side of the chart, a marking device, means for supporting the marking device at the face of the chart in front of said counter, said device adapted to mark upon the face of the chart the setting of said counter when the latter presses the chart against it, link mechanism connected to said counter and movable between limiting positions for moving the latter into and out of its printing positions, a pair of solenoids for moving said link mechanism between its limiting positions, and means ncluding a pair of cams driven with said chart for controlling the energizing of said solenoids, said cams operative to effect successive energization of said solenoids.

6. In combination with a meter which records on a driven chart the instantaneous values of a variable and has associated therewith a printing counter driven to totalize the values of the variable, means supporting said counter for movement against said chart to print thereon the totals of the counter, a solenoid operative when energized to move said counter against said chart, a circuit including a switch operable manually for energizing said solenoid at will, and a circuit including a cam control switch for energizing said solenoid at the ends of predetermined time intervals, the cam of said switch being driven with said chart.

7. In combination with a meter which records on a driven chart the instantaneous values of a variable and has associated therewith a printing counter driven to totalize the values of the variable, means supporting said counter for movement against said chart to print thereon the totals of the counter, a solenoid operative when energized to move said counter against said chart, a circuit including a pair of switches, one controlled by a cam driven with the chart and the other controlled by a solenoid, for controlling the energizing of said first mentioned solenoid, said solenoid controlled switch normally connecting said first mentioned solenoid to a source of power and operative when energized to open the connection to said first mentioned solenoid and to connect said second mentioned solenoid to the source of power, and a power circuit for said second mentioned solenoid including a switch adapted to be closed by said counter when the latter is moved to its printing position.

8. In combination with a meter which records on the front face of a driven chart the instantaneous values of a variable and has associated therewith backing means for the chart, a printing counter driven to totalize the values of the variable, a lever pivotally supported at a point adjacent the back face of said backing means, means pivotally connecting said counter to said lever, a projecting arm on said counter engageable with an abutment portion on said lever, means for yieldingly urging said arm into engagement with said abutment portion, said lever and abutment portion operating when moved in one direction to swing said counter toward the back face of the chart, abutment means for limiting movement of said lever in said direction, said counter being adapted to continue to swing by its inertia into engagement with said one side of the chart when said lever engages said abutment means, a solenoid connected to said lever and operating when energized to move said lever into engagement with said abutment means, and means for periodically energizing said solenoid.

9. In combination with a meter which records on a driven chart the instantaneous values of a variable, a printing counter driven to totalize the values of the variable, a lever pivotally supported at a point adjacent one side of said chart, means pivotally connecting said counter to said lever, a projecting arm on said counter engageable with an abutment portion on said lever, means for yieldingly urging said arm into engagement with said abutment portion, said lever and abutment portion operating when moved in one direction to swing said counter toward the chart, abutment means for limiting movement of said lever in said direction, said counter continuing to swing by its inertia into engagement with the chart when said lever engages said abutment means, a solenoid connected to said lever and operating when energized to move said lever into engagement with said abutment means, a circuit for connecting said solenoid to a source of power, a switch in said circuit, and cam means actuated by the chart driving means for controlling said switch.

10. The combination of claim 9 additionally including manually operable means for energizing said solenoid at will.

11. The combination of claim 3 in which the backing means for the chart is formed with an opening aligned with the marking device and the printing counter when the latter is actuated to printing position.

WALTER E. DUERINGER.

REFERENCES CITED

The following references are of record in the file of this patent:

UNITED STATES PATENTS

| Number | Name | Date |
| --- | --- | --- |
| 800,617 | Morse et al. | Sept. 26, 1905 |
| 1,039,724 | Gallaher | Oct. 1, 1912 |
| 1,664,407 | Eshbaugh | Apr. 3, 1928 |
| 2,005,108 | Pudelko | June 18, 1935 |
| 2,148,861 | Kall | Feb. 28, 1939 |
| 2,214,796 | Ostler | Sept. 17, 1940 |
| 2,305,876 | Kienzle | Dec. 22, 1942 |
| 2,389,827 | Stein | Nov. 27, 1945 |